United States Patent [19]
Wyslotsky

[11] Patent Number: 5,632,133
[45] Date of Patent: May 27, 1997

[54] METHOD OF PRE-FORMED IN-LINE THERMOFUSING OF MULTILAYER POLYMERIC FILMS TO FORM PACKAGING COMPONENTS

[76] Inventor: Ihor Wyslotsky, 5050 Newport Dr., Section 7, Rolling Meadows, Ill. 60008

[21] Appl. No.: 222,105

[22] Filed: Jul. 25, 1994

Related U.S. Application Data

[63] Continuation-in-part of Ser. No. 199,106, Feb. 22, 1994, abandoned.

[51] Int. Cl.⁶ .......................... B65B 31/00; B65B 47/00
[52] U.S. Cl. .................. 53/433; 53/453; 53/140
[58] Field of Search .......................... 156/102, 103, 156/105, 106; 53/433, 449, 453, 140, 559

[56] References Cited

U.S. PATENT DOCUMENTS

| | | | |
|---|---|---|---|
| 3,558,408 | 1/1971 | Hamilton et al. | 156/102 X |
| 3,648,834 | 3/1972 | Gifford et al. | 53/449 X |
| 3,661,322 | 5/1972 | Norman | 53/449 X |
| 3,765,976 | 10/1973 | Nasica | 156/105 |
| 4,684,025 | 8/1987 | Copland et al. | 53/453 X |
| 4,685,274 | 8/1987 | Garwood | 53/453 X |

FOREIGN PATENT DOCUMENTS

| | | | |
|---|---|---|---|
| 3019503 | 11/1981 | Germany | 53/140 |
| 50-25879 | 8/1975 | Japan | 53/453 |

*Primary Examiner*—Linda Johnson

[57] ABSTRACT

The novel method of the present invention is directed to the continuous formation of a multi-layer, laminated package by in-line thermofusing of several separate films. A first roll of the first film having defined first properties is provided, along with at least a second roll of a second film having defined second properties. A tie layer may be disposed, as either a separate film disposed between, or co-extruded upon contacting surface of one of the first or second films. A tacking station is provided for continuous disposition of the first and second films at the tacking station. At the tacking station, where the first film is tacked to at least the second film. Such tacking is carried out by contacting the respective films and by applying a first pressure to at least a portion thereof to provide a continuous strip of pre-laminated film. The continuous strip of pre-laminated joint film is subjected to sufficient heat and a second pressure sufficient to laminate and to bond together (i.e., thermofuse) the films which have been previously tacked together to form the pre-laminated joint film. In-line, the continuous strip of pre-laminated joint film is subjected to the application of heat thereto sufficient for thermoforming. The heated portion of the pre-laminated joint film is thermoformed into a package component.

31 Claims, 3 Drawing Sheets

METHOD OF PRE-FORMED IN-LINE THERMOFUSING OF MULTILAYER POLYMERIC FILMS TO FORM PACKAGING COMPONENTS

The present application is a continuation-in-part of application Ser. No. 08/199,106, filed on Feb. 22, 1994, now abandoned.

BACKGROUND OF THE INVENTION

The present invention relates generally to methods of producing packages, and more particularly to a method of continuously forming a multi-layer, laminated package which is suitable for a vacuum or modified atmosphere packaging, and is particularly useful in the packaging of various comestible and pharmaceutical product, including bakery goods, meat products, etc.

In the prior art, it has been deemed desirable to form package components especially for comestible packaging utilizing a vacuum technique or modified atmosphere characteristics, which have been effectuated by means of providing a barrier layer within a laminated construction for such packaging. However, the production of various laminated films has been somewhat costly. Such increased cost has been caused by at least the necessity for (a) making the laminated film stock in two operations and at separate locations, and (b) utilizing for such lamination separate and different machinery from that used to form the packaging. Whereupon, the separately produced laminated film may then be loaded onto a package formation machine, such as a form, fill and seal machine.

Accordingly, it has been desirable to develop methods of forming a suitable laminated film stock, and to do so in-line using a thermoforming machine which will also thermoform packaging, and where appropriate, also to permit filling the package with product, and sealing the packaging-all in-line (i.e., on the same machine). In addition the inventive methods hereof can be used for thermoforming of packages only, and without sealing.

In view of the defects and deficiencies of prior art systems, it is a material object of the present inventive methods to laminate and to form continuously multi-layer laminated packaging materials, having the desirable, barrier characteristics of modified atmosphere, or vacuum package or other film structures which require that two or more layers be laminated together, while nearly simultaneously being thermoformed.

It is likewise a material object of the present inventive method to provide a continuous strip of pre-laminated film, in-line, for thermoforming into container components to nearly simultaneously form the container component and to thermofuse together those films comprising the film pre-laminate structure. In an alternative embodiment, the pre-laminate may be thermally bonded together prior to (rather than simultaneously with) the formation of the container component.

These and other objects and advantages of the novel methods of continuously forming a multi-layer laminated package will become apparent to those of ordinary skill in the art upon review of the following summary of the invention, brief description of the drawing, detailed description of preferred embodiments, appended claims and accompanying drawing.

SUMMARY OF THE INVENTION

The novel method of the present invention is directed to the continuous formation of a multi-layer, laminated package. In one preferred embodiment, a first roll of the first film having defined first properties is provided, along with at least a second roll of a second film having defined second properties. Additional rolls of film, having yet different properties, may also be provided. One of the properties of films for use in the methods of one embodiment of the present invention is the inclusion of a heat and pressure sensitive polymer adhesive layer which, under proper conditions, causes a strong bond to form between two or more films. A nip and tacking station is provided for continuous disposition of at least the first and second films at the nip and tacking station, where the first film is tacked at least to the second film. Such tacking is carried out by contacting the respective films and by applying a first pressure to at least a portion thereof to provide an immediate contact between the two or more layers of the formed continuous strip of pre-laminated joint film.

The nipping disposition of the rollers is used for the purpose of pressing out any entrained air from between the laminating surfaces while the pressure and heated rollers thereof cause the laminating surfaces to acquire a relatively low level of bonding between them and not to allow the air to be trapped therebetween. This minimal bond achieved by the contacting surfaces is necessary for allowing appropriate machine handling of the film strip in further steps of the methods of the present invention.

Immediately thereafter, and in-line (i.e., on the same machine or feeding directly into an adjacent machine), the continuous strip of pre-laminated joint film is subjected to the application of pressure thereto in an amount sufficient for thermoforming. Thereafter, the heated portion of the pre-laminated joint film is thermoformed into a package component, while simultaneously applying a second pressure thereto sufficient to laminate and bond by fusing under pressure the films which have been previously tacked together to form the pre-laminated joint film. In preferred embodiments, such pressure is applied in preferably two stages by respective streams of air upon the top surface of the pre-laminated joint film. The techniques of the present invention may be characterized as "thermofusing", as heat along with suitable selected pressure is used to merge or unite the various previously separate polymeric films.

In another preferred embodiment, the step of thermo-lamination of the pre-laminate joint film may alternatively be carried prior to formation of the container component, rather than simultaneously therewith.

Accordingly, by means of such pre-tacked joint laminate, formation of a multi-layer laminated film, and packaging components formed therefrom, may be accomplished, in-line, with the attendant reduction in cost and the greater conveniences associated therewith in further processing.

BRIEF DESCRIPTION OF THE DRAWING

The novel methods of continuously forming a multi-layer laminated package of the present invention are depicted in the drawing, and in which.

DETAILED DESCRIPTION OF PREFERRED EMBODIMENTS

Figure 1:
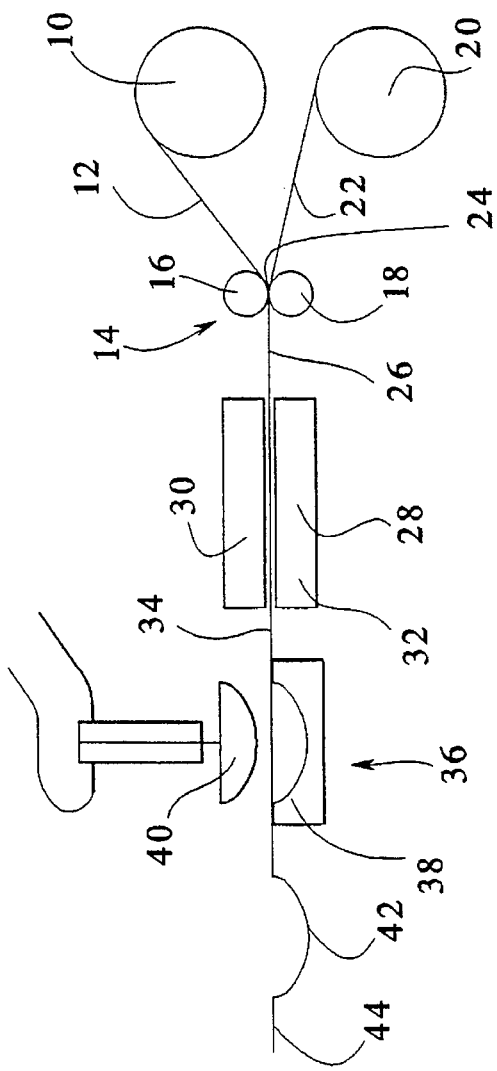
FIG. 1 is a diagrammatical representation of the steps of the novel method of the present invention, in respective stations, and in which at storage roll stations at least two (2) storage rolls are provided for carrying rolls of first and second films having first and second properties, and for feeding such film continuously to a tacking station for formation of a pre-laminated joint film, thereafter, to a heating station for heating the pre-laminate structure, and then to a thermoforming and bonding station for conversion of pre-laminate joint film into a package component.

The method of laminating film layers hereof may be deemed analogous to the coextrusion process used to form plastic sheets. In coextrusion, the polymeric tie layer (or "adhesive", as sometimes referred to herein) is extruded between two or more layers of the film, which like the tie layer, is being extruded from a barrel through a coextrusion die. In these methods, the various layers are heated to a molten state and then joined together under pressure utilizing an appropriate tie layer, for example, with diverse films like polyester and polyvinyl chloride. Only if compatible physics, theology and chemistry are present can such a tie layer or adhesive layer be coextruded.

The developed method, however, utilizes tie layers known to those of ordinary skill in the art, and manufactured and obtainable from various sources, that can be used for joining together two or more otherwise non-compatible films. This is achieved through the use of the inventive methods hereof of tacking together the various diverse films and then heating these films to a high temperature required for forming and fusing two films together with a tie layer disposed therebetween while applying pressure. Appropriate temperature control of the tie layer is achieved by heating the films, for example in some preferred embodiments, with an infrared heating source of wavelength of approximately 3.5 microns. It may be necessary, according to the construction, to have the tie layer to reach a higher, or a lower temperature then the adjacent layers of the film. In such cases the tie layer is selected on the basis of its capacity to absorb the radiant energy in varying degrees. Conversely, it is possible to vary the wavelength of the radiant energy emitter. By so doing it is possible to change the absorption capacity of the various types of polymers used in a particular construction and thus to create the necessary temperature differentials of the various layers of films being synthesized. Such infrared source can also uniformly heat the plastic sheet throughout its thickness. Of course, other suitable heating methods may be used.

It was found that the pressure of laminating employed during thermoforming contributes significantly to the degree of bonding obtained between the two layers. As set forth graphically in FIG. 2, at least a two stage pressure application may preferably be employed. The thermoforming pressure stage is preferably applied at a constant rate over a period of about 15–75 milliseconds in certain preferred embodiments, beginning at low levels in order to avoid distortion of the component films.

Thereafter, and extending over a comparable period of about 35–75 milliseconds, for example, a bond pressure is applied at an increased level from the previously applied thermoforming pressure. The bonding strength obtained has been determined to be proportional to the level of variable bonding pressure applied. These times of pressure application will vary according to the polymers used, pressures applied, temperatures attained, and other parameters.

Referring now to the drawing, a method of continuously forming a multi-layer laminated package is schematically set forth therein. In particular, a first roll 10 of a first film 12 having defined first properties is directed to a tack station generally 14 comprising rollers 16, 18. A second roll 20 of a second film 22 having second properties is provided to the tacking station 14 for tacking together within the nip 24 of tacking station 14.

Of course, more than two (2) different films may be directed to the tacking station 14; in that event, additional rolls (not shown) of additional films having additional characteristics may also be utilized to form the pre-laminated joint film 26. Examples of some acceptable films usable as first film 12 and second film 22 in the inventive methods of the present invention include polyethylene teraphthalate or polyester sheeting, polyvinyl chloride (PVC) sheeting, high impact polystyrene (HIPS) sheeting, polycarbonate sheeting, polyamide (Nylon) sheet, polyolefin sheeting, polyacrylonitrile sheeting, ethyl vinyl alcohol copolymer sheeting, etc. The tie layer disposed in sheet form in certain alternative preferred embodiments between various sheets may comprise any mutually compatible material including, for example, modified polyolefin polymer, copolymer or modified ethyl vinyl acetate polymer or copolymer.

The pre-laminated joint film 26 is formed at tacking station 14 and continues to a heating station generally 28 comprising upper and lower heaters 30, 32. The pre-laminated joint film 26 is heated to a temperature which is sufficient for thermoforming and comprises heated joint film 34 which is then directed to a simultaneous thermoforming and bonding station generally 36. Such thermoforming and bonding station may comprise a vacuum draw down and chamber 38 with a plug assist 40. Of course, other types of thermoforming equipment known to those of ordinary skill in the art may be utilized, including the use of air pressure. For example, a flat plate and a pressure chamber can also be used, if the film is to bond and remain flat.

Such thermoforming of the heated pre-laminated joint film 34 is applied at a second pressure, which may be applied in stages, and which is sufficient both to form the package component 42 continuing to be held on web 44, and also to laminate together films 12, 22 of heated pre-laminated joint film 34 into a fully bonded structure. Such second pressure may be in the range of 10 to 100 lbs. per square inch. The amount of pressure provided as the second pressure is, in preferred embodiments, sufficient to remove all air gaps between the first film 12 and the second film 22.

The temperatures which are sufficient for such thermo-forming and simultaneous thermo-lamination are in the order of 250° to 425° F., and may be modified based upon principles known to those skilled in the art, depending upon, inter alia, the type and thickness of films being utilized.

In other preferred embodiments of the method of continuously forming a multi-layer laminated package of the present invention, three or more films may be utilized to provide a further variety of different selected characteristics to the final package structure. In preferred embodiments, at least one film thereof may include a heat activatable adhesive 46 disposed on the upper surface, for example, of second film 22 for subsequent activation at thermo-forming and bonding station 36 to provide a fully thermo-laminated package component 42.

In preferred embodiments first film 12 and second film 22 may be essentially clear, although colored films and/or films including visual indicia may be utilized where special effects are desired.

It has been found that the pre-laminated joint film 26 may be somewhat hazy prior to thermoforming and thermo-lamination thereof. In that regard, such second pressure which is applied at the thermoforming and bonding station 36 is sufficient orient the film and to convert the somewhat or substantially hazy joint film 26 into a substantially clear thermo-laminated film.

Such first pressure for tacking purposes may be in the range of approximately 5 to 25 lbs. per square inch, whereas the second pressure, which may be employed in gradually increasing amounts over a designated time period, for thermoforming and thermobonding purposes may be of the range of approximately 10 to 100 lbs. per square inch preferably using air pressure in preferred embodiments, as more completely described, infra.

Figure 2:
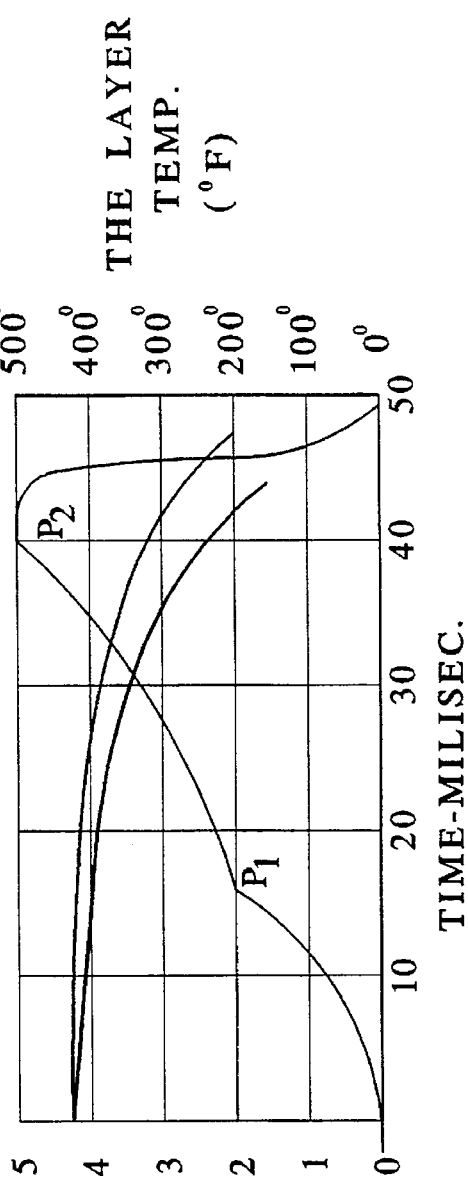
FIG. 2 is a graphical representation of pressure (left side scale) versus time, illustrating the sub-steps of initial thermoforming at a low and increasing pressure and over a time period of approximately 15 milliseconds, and thereafter bonding of the films to an extent proportional to the further pressure applied to the tacked together films over a further period of approximately 35 milliseconds in some preferred embodiments, and further graphically showing temperature (right side scale) versus time, wherein the tie layer temperature falls off over time respectively for 5 mil. and 12 mil. laminate structures.

With regard to FIG. 2, a first film 50, which is preferably somewhat thinner in dimension, is depicted schematically being tacked together with a second film 54, which is preferably somewhat heavier in its dimensions. Disposed therebetween and attached to the thinner film layer 50 is a tie layer 52.

Figure 3:
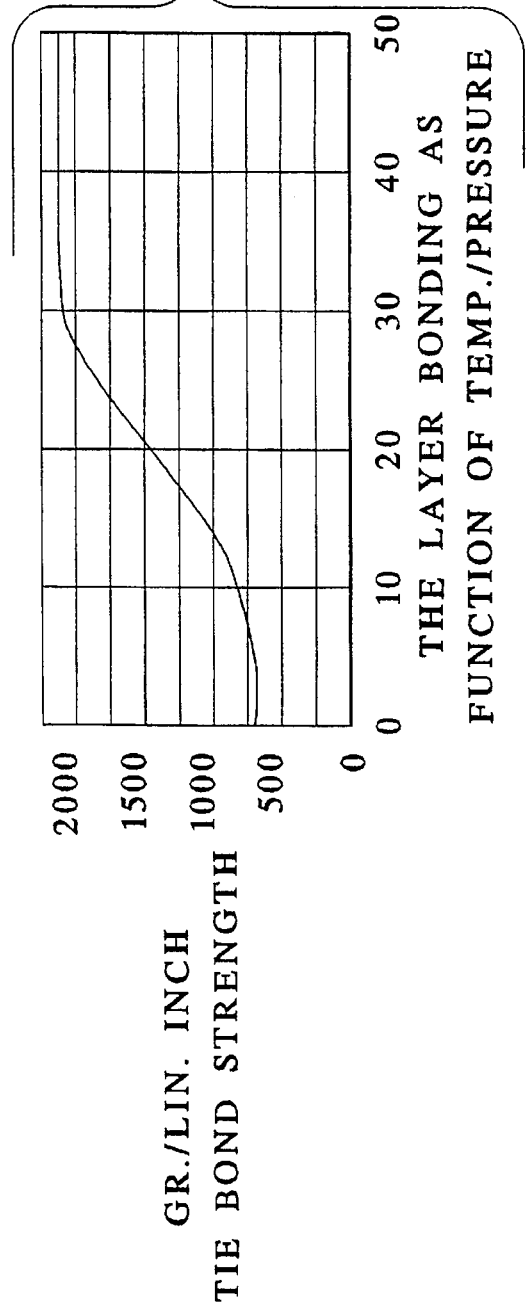
FIG. 3 is a graphical representation of the developed bond strength (in grams per lineal inch) versus time (in milliseconds) and depicting the tie layer bonding as a function of temperature and pressure.

After such initial tacking in a nip roller, radiant heat is applied to the tacked together film to permit the tie layer to reach a proper bonding temperature. After reaching such temperature the tacked together film structure is formed into a packaging component by the application of a primary stream of hot air ($P_1$) upon the exterior surface 56 of the thinner film 50, which forces the tacked together films into a mold (not shown). Such mold has relatively chilled walls of a temperature sufficiently lower to solidify at least partially the warm plastic. This forming step is carried out over a period of approximately 15–75 milliseconds as shown graphically in FIG. 3. Thereafter, the then formed film is treated with a secondary stream of air of a reduced temperature to press such formed film against such mold walls, such secondary stream of air having a relatively higher and increasing pressure ($P_2$), as shown in FIG. 3, over a period of approximately 25–75 milliseconds. Thereafter, the pressure is relieved and the mold is open.

Also set forth on FIG. 3 is a graphical representation of the temperature of the tie layer 52 during the same time frame as the application of pressures of $P_1$ and $P_2$, and taking place over a period of approximately 50–150 milliseconds.

As shown in FIG. 3, a laminate structure of 5 mils. will fall off in temperature less quickly than a laminate structure of 12 mils. in thickness.

Figure 4:
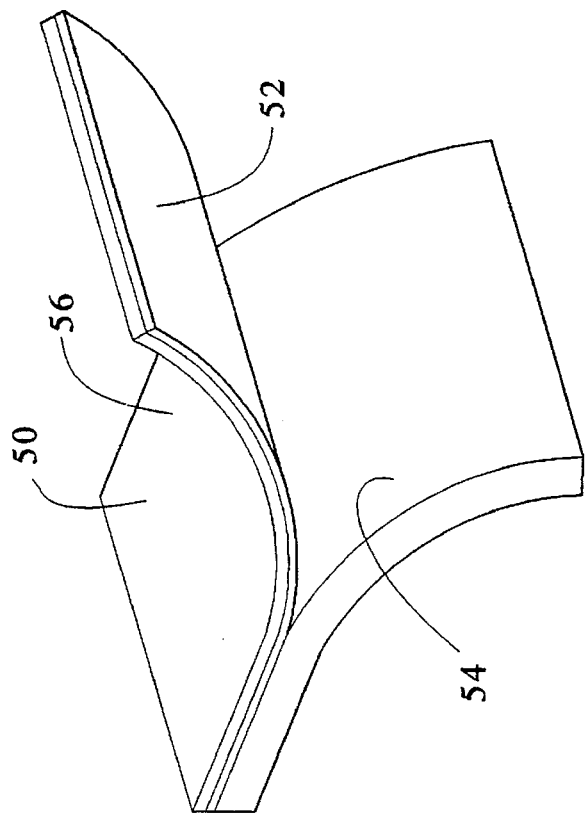
FIG. 4 is an enlarged schematic representation showing one film layer having a tie layer adhered to a surface thereof and facing a second and preferably thicker film, and depicting graphically the tacking together thereof.

As shown in FIG. 4, the bond strength developed is depicted graphically against tie layer bonding as the function of temperature and pressure. In particular, FIG. 4 shows an increase over a period of approximately 50 milliseconds in the bond strength, as the pressure is increased as set forth in the same time frame on FIG. 2, supra.

The first film 12 may be selected to have characteristics of flexibility, and may comprise the following polymeric types of film having the adhesive layer co-extruded thereon (rather than as a separate sheet, as with some of the examples, supra), including various types and grades of polyolefin sealants coextruded with an appropriate tie layer, other polyolefins or nylons with tie layers coextruded, polyolefins and/or ethyl vinyl alcohol with tie film coextruded, etc., as provided by Dow Chemical Corp., Quantum Corp., DuPont de Nemours Corp., and others. The second film 22 may be selected to have characteristics of rigidity, and may comprise, inter alia, the following polymeric types of film, available from the following manufacturers, including polyethylene teraphthalate sheet (Eastman Tennessee Company; 3M Company), polyvinyl chloride sheet (American Mirrex Company; Oxy Chemical Company; Nan-Ya Corporation), polyacrylonitrite (Vistrou Corporation; Monsanto Corporation), polypropelene (Monsanto Corporation; Phillips 66 Company), styrene sheeting (HIPS, GPS) (Dow Chemical Company), polycarbonte (General Electric), high density polyethylene (DuPont of Canada, Ltd.).

At least one of the films, such as second film 22 may include a first tie layer or film 46 on the contacting surface thereof for attaching with the first film 12. Of course, additional adhesives may be utilized where necessary with additional lamination of films according to methods and techniques known to those of ordinary skill in the art. Such tie films may comprise pressure sensitive, thermo-laminating, or other forms of tie films known to those of ordinary skill in the art. Adhesives which are particularly useful include, for example, modified ethyl vinyl acetate, methyl ethyl acrylate, various waxes, and polyolefin copolymers.

Figure 5:
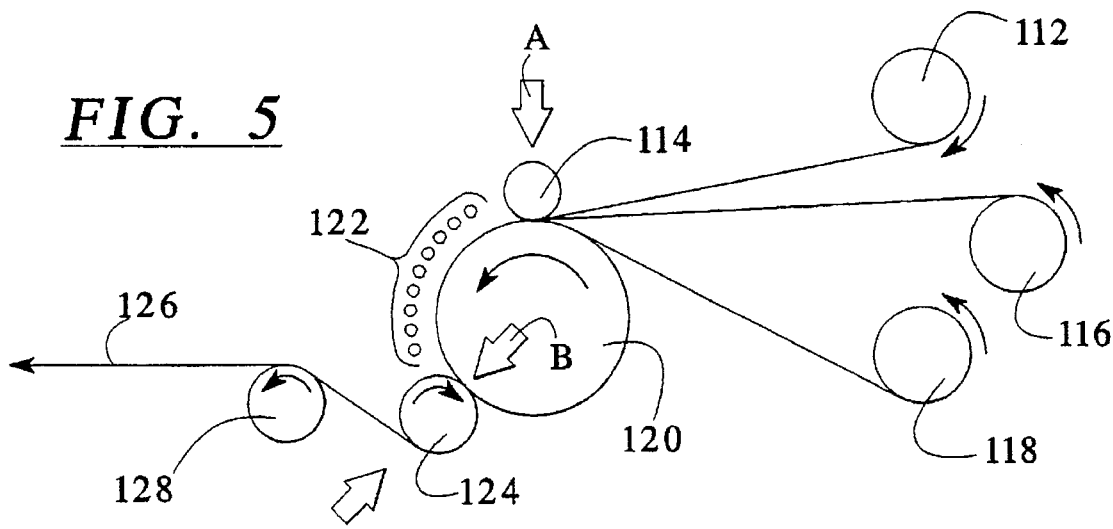
FIG. 5 is a schematic representation showing another preferred embodiment wherein the step of thermo-lamination of the pre-laminate joint film is carried out prior to formation of the container portion, rather than simultaneously therewith.
Figure 6:
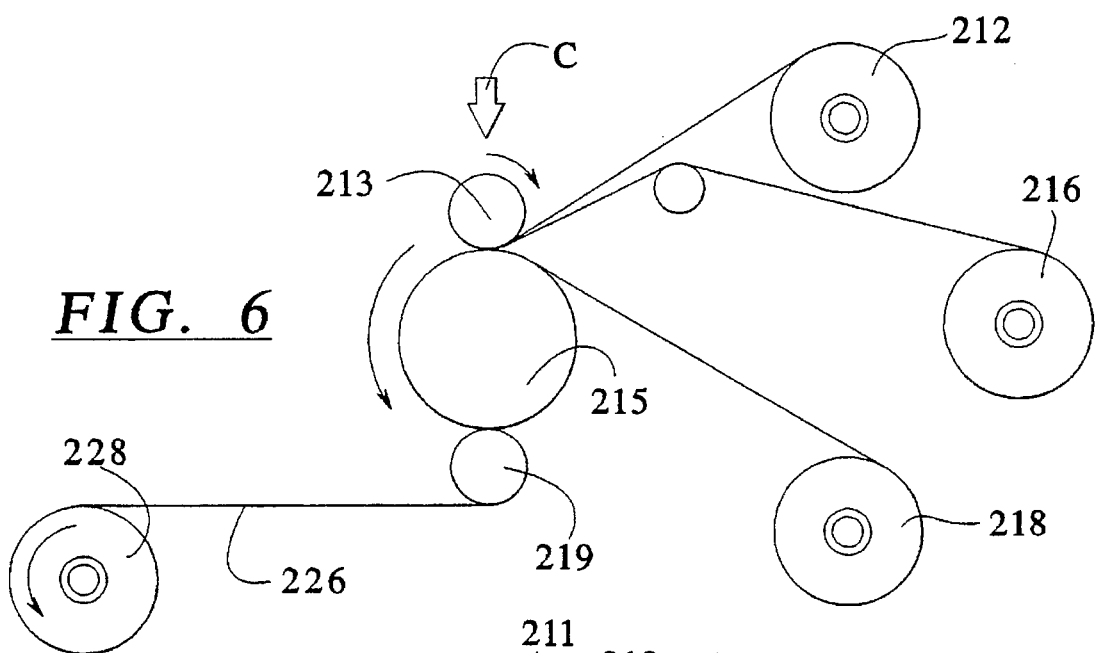
FIG. 6 is a schematic view of an alternative method of fusing lamination which includes a tungsten wire (or string)
Figure 7:
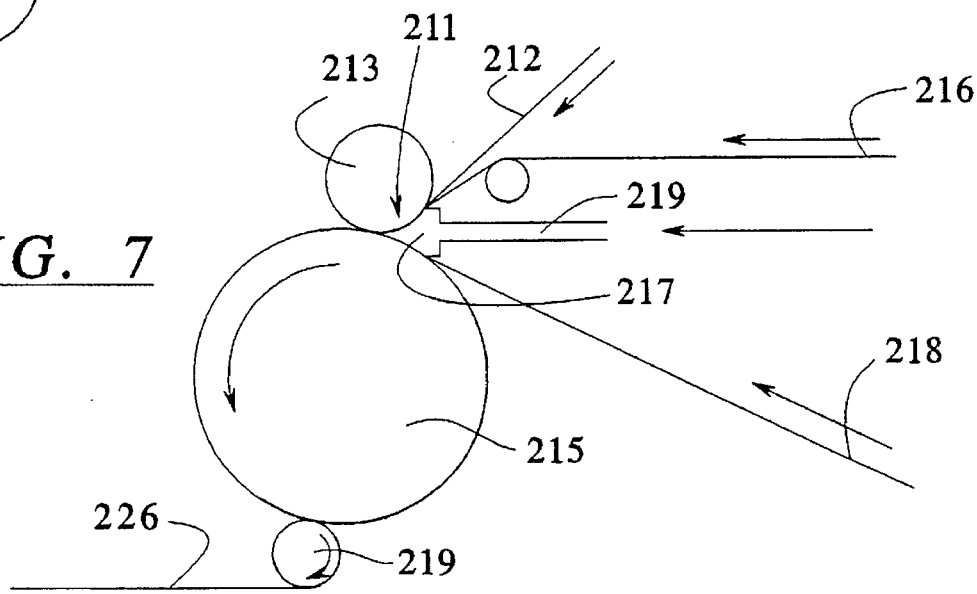
FIG. 7 is an enlarged view of the center section of FIG. 6 showing in greater detail the use of a tungsten wire (or string) which emits a high level of radiant energy at a wave length to which the tie layer is opaque (85% absorption).

The embodiment set forth in FIGS. 5, 6 and 7 are similar but differ from the embodiments of FIGS. 1–4 in that the thermo-lamination step of the pre-laminate joint film is carried out prior to formation of the container portion, rather than simultaneously therewith. In particular, a first film 112 is brought to a nip 114 along with a tie layer 116 and a second film 118. The nip roller 114 exerts tacking pressure at Arrow A in connection with a preferably larger fusing roller 120 against which a fusing temperature radiant heater schematically shown at 122 is directed. A fusing roller 124 impinges upon fusing roller 120 and exhorts a pressure depicted at Arrow B sufficient to fuse the film pre-laminated. The then fused laminate film 126 is directed, for example, by means of another directional roller 128 for subsequent formation into a container element.

An alternative form of fusing is shown in FIG. 6 wherein a first film 212 and a tie layer 216 and a second film 218 are brought together at a fusing nip between rollers 213 and a larger chill roller 215, which may be cooled by water cooling means, wherein a fusing pressure at Arrow C is provided ultimately to form fused film 226, which may be collected at roller 228 or directed in-line to a container forming element.

FIG. 7 depicts in enlarged form at the central portion of the structure of FIG. 6, and shows layers 212, 216, and 218 being directed to a nip generally 211 formed by roller 213 and chill roller 215. At such nip 211, a tungsten wire or string 217 is provided, and a nitrogen gas emission element 219 bathes nip 211 in nitrogen gas. The tungsten wire 217 emits a high level of radian energy at a wave length to which the tie layer 216 is opaque (at 85% absorption). The nitrogen is pumped into the vicinity of the tungsten string nip 211 to surround the tungsten wire 217 and to prevent its oxidation. A directional roller 219 may be provided to assist in directing and collecting the fused laminated film 226.

The temperature range for the pre-laminated joint film structure 26 may be, for example, in the approximate range of 120° F. to 175° F.

The novel method of continuously forming a multi-layer laminated package of the present invention may further include the steps of forming a package bottom. Of course, package tops may likewise be formed by similar methodology.

Additional steps in formation of package components according to the novel methods of the present invention my include thereafter providing a lid component matingly upon the package component to preform a completed package. Thereafter, the completed package may have the atmosphere thereof modified, and the package may then be sealed together to form a modified atmosphere package (MAP). Of course, the package may be evacuated, or an essentially inert gas may be injected therein.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A method of in-line thermofusing of multi-layer, laminated polymeric films to form packaging components, said method comprising the steps of:
   providing a first essentially clear polymeric roll of first film having defined first properties;
   providing at least a second essentially clear polymeric roll of a second film having defined second properties;
   providing a tacking station for continuous disposition of at least said first and said second films thereto;
   at said tacking station, tacking the first film to at least the second film by bringing the respective films into contacting array and by applying pressure of at least a first pressure of sufficient pressure to tack the film together to at least a portion thereof to form a continuous strip of pre-laminated joint film;
   subjecting said continuous strip of said pre-laminated joint film to the application of sufficient heat and a second pressure sufficient for bonding and thermo-laminating together the films of said pre-laminated joint film into a substantially fully fused laminated joint film and thereby bonding and thermo-laminating together the films of said pre-laminated joint film into a substantially fully fused laminated joint film;
   subjecting said continuous strip of said laminated joint film to the application of heat sufficient for thermforming said laminated joint film; and
   thermoforming said heated portion of said laminated joint film into an essentially clear package component.

2. The method of claim 1 wherein at least two films are laminated together.

3. The method of claim 1 wherein at least one film thereof includes a heat activatable adhesive on the surface thereof for activation during said thermoforming of the pre-laminated joint film.

4. The method of claim 1 wherein the amount of said second pressure applied is sufficient to remove essentially all air gaps and surface irregularities between said first film and said second film.

5. The method of claim 4 wherein at least one of said first and second films is essentially clear.

6. The method of claim 5 wherein said pre-laminated joint film is substantially hazy.

7. The method of claim 6 wherein the amount of said second pressure is sufficient to render substantially clear said substantially hazy joint film by reason of the lamination of said first and second films.

8. The method of claim 1 wherein said second pressure is of the range of approximately 10 to 100 lbs. per square inch.

9. The method of claim 1 wherein said first film is selected from the group comprising polyethylene teraphthallate sheeting polyester sheeting, polyvinyl chloride (PVC) sheeting, high impact polystyrene (HIPS) sheeting, polycarbonate sheeting, polyamide (Nylon) sheet, polyolefin sheeting, polyacrylonitrile sheeting, and ethyl vinyl alcohol copolymer sheeting.

10. The method of claim 1 wherein said second pressure is applied in at least two stages.

11. The method of claim 10 wherein said second pressure stage of said second pressure is applied in a selected variable amount above the level of said first pressure stage, depending upon the bond strength designated.

12. The method of claim 10 wherein said second pressure state of said second pressure is applied in a selected variable amount above the level of said first pressure stage, depending upon the bond strength designated.

13. The method of claim 1 wherein said first film is selected from the group consisting of polyolefin sealants coextruded with a compatible tie layer, polyamides with tie layers coextruded, polyolefins and/or polyethyl vinyl alcohol with tie film coextruded.

14. The method of claim 1 wherein said second film is selected from the group consisting of polyethylene teraphthalate, polyvinyl chloride, polyacrylanitrite, polypropelene, styrene, polycarbonte, high density polyethylene sheeting.

15. The method of claim 1 wherein at least one of said first and second films includes a first adhesive on a surface thereof for contacting with a surface of another of said films to facilitate tacking said films together.

16. The method of claim 15 wherein said first adhesive comprises a tie layer which is mutually compatible with said first and second films.

17. The method of claim 1 wherein said package component comprises a package bottom.

18. The method of claim 14 wherein at least three films are tacked together, and at least two of which includes an adhesive on a contacting surface thereof.

19. The method of claim 15 wherein at least said first adhesive is a heat activatable polymeric adhesive.

20. The method of claim 15 wherein at least said first adhesive is pressure sensitive.

21. A method of claim 1 wherein said application of heat to said pre-laminated joint film raises the temperature thereof to the range of approximately 120° F. to 175° F.

22. The method of claim 10 wherein said first pressure stage is of a duration of about 15–75 milliseconds.

23. The method of claim 10 wherein said second pressure stage is of a duration of about 35–75 milliseconds.

24. The method of claim 1 wherein said thermoforming is carried out by vacuum drawing into a mold.

25. The method of claim 1 further comprising the steps of:
loading a product to be packaged into said thermoformed laminated package component;
thereafter providing a package lid component matingly upon said package component to form a completed package;
modifying the atmosphere of said completed package; and
while under such modified atmosphere, sealing together said completed package.

26. The method of claim 25 wherein said modifying atmosphere comprises evacuating said completed package.

27. The method of claim 25 comprises injecting an essentially inert gas into said completed package prior to said sealing thereof.

28. The method of claim 3 wherein said heat activatible adhesive comprises a tie layer selected from the group consisting of modified or polyolefin polymer, and modified ethyl vinyl acetate polymer or copolymer.

29. The method of claim 1 wherein the steps of tacking the first film to the second film and subjecting the continuous strip of said pre-laminated joint film to the application of sufficient heat and pressure sufficient for bonding and thermo-laminating are carried out simultaneously.

30. The method of claim 28 wherein said step of providing sufficient heat and pressure sufficient for bonding and thermo-laminating comprises subjecting at least said first and second films to emissions of radiant energy from a tungsten wire.

31. The method of claim 1 wherein said first pressure is of the range of approximately 5 to 25 lbs per square inch.

* * * * *